United States Patent
Hogan et al.

(10) Patent No.: US 12,032,981 B2
(45) Date of Patent: Jul. 9, 2024

(54) FORCE PROVISIONING USING AVAILABLE RESOURCES

(71) Applicant: VMware LLC, Palo Alto, CA (US)

(72) Inventors: Cormac Hogan, Cork (IE); Frank Denneman, Utrecht (NL); Duncan Epping, Utrecht (NL)

(73) Assignee: VMware LLC, Palo Alto, CA (US)

( * ) Notice: Subject to any disclaimer, the term of this patent is extended or adjusted under 35 U.S.C. 154(b) by 579 days.

(21) Appl. No.: 17/119,577

(22) Filed: Dec. 11, 2020

(65) Prior Publication Data
US 2022/0188137 A1    Jun. 16, 2022

(51) Int. Cl.
G06F 9/455    (2018.01)

(52) U.S. Cl.
CPC .......... *G06F 9/45558* (2013.01); *G06F 2009/45579* (2013.01)

(58) Field of Classification Search
CPC ............ G06F 9/45558; G06F 2009/45579
See application file for complete search history.

(56) References Cited

U.S. PATENT DOCUMENTS

| | | | |
|---|---|---|---|
| 7,577,722 B1 | 8/2009 | Khandekar et al. | |
| 9,069,600 B2 * | 6/2015 | Schmidt | G06F 9/45533 |
| 9,578,064 B2 | 2/2017 | Lango et al. | |
| 9,747,287 B1 * | 8/2017 | Bhardwaj | G06F 3/0631 |
| 10,474,372 B1 * | 11/2019 | Olson | G06F 3/0604 |
| 10,579,403 B2 | 3/2020 | Antony et al. | |
| 10,630,767 B1 * | 4/2020 | Dhoolam | G06F 9/445 |
| 2004/0243699 A1 | 12/2004 | Koclanes et al. | |
| 2007/0067776 A1 * | 3/2007 | McCarthy | G06F 9/5011 718/104 |
| 2009/0133097 A1 * | 5/2009 | Smith | G06F 21/53 726/1 |
| 2011/0178790 A1 * | 7/2011 | Golbourn | G06F 11/1088 703/22 |
| 2015/0006665 A1 * | 1/2015 | Krishnamurthy | G06F 3/0644 709/213 |
| 2015/0381725 A1 * | 12/2015 | Haapaoja | H04L 67/1097 709/213 |
| 2017/0177238 A1 * | 6/2017 | Tati | G06F 9/45558 |
| 2019/0230126 A1 * | 7/2019 | Kumar | H04L 45/64 |
| 2021/0373925 A1 * | 12/2021 | Hao | G06F 9/45558 |

* cited by examiner

*Primary Examiner* — Michael W Ayers
(74) *Attorney, Agent, or Firm* — Quarles & Brady LLP

(57) ABSTRACT

The present disclosure is related to methods, systems, and machine-readable media for force provisioning using available resources. A request can be received to provision a virtual computing instance by a software defined data center according to a storage policy specified as part of the request. An insufficiency of storage policy resources to satisfy the storage policy specified for the VCI can be determined. A best-match storage policy can be determined for the VCI based on available storage policy resources, and the VCI can be force provisioned according to the best-match storage policy using the available storage policy resources.

17 Claims, 4 Drawing Sheets

FORCE PROVISIONING USING AVAILABLE RESOURCES

BACKGROUND

A data center is a facility that houses servers, data storage devices, and/or other associated components such as backup power supplies, redundant data communications connections, environmental controls such as air conditioning and/or fire suppression, and/or various security systems. A data center may be maintained by an information technology (IT) service provider. An enterprise may purchase data storage and/or data processing services from the provider in order to run applications that handle the enterprises' core business and operational data. The applications may be proprietary and used exclusively by the enterprise or made available through a network for anyone to access and use.

Virtual computing instances (VCIs) have been introduced to lower data center capital investment in facilities and operational expenses and reduce energy consumption. A VCI is a software implementation of a computer that executes application software analogously to a physical computer. VCIs have the advantage of not being bound to physical resources, which allows VCIs to be moved around and scaled to meet changing demands of an enterprise without affecting the use of the enterprise's applications. In a software defined data center, storage resources may be allocated to VCIs in various ways, such as through network attached storage (NAS), a storage area network (SAN) such as fiber channel and/or Internet small computer system interface (iSCSI), a virtual SAN, and/or raw device mappings, among others.

A storage policy can be specified for a VCI or another software defined data center (SDDC) object. In the absence of resources sufficient to satisfy a storage policy, previous approaches may force provision the VCI with the simplest possible layout. Such approaches may provision the VCI in such a manner without any regard to what resources may actually be available.

DETAILED DESCRIPTION

Figure 1:
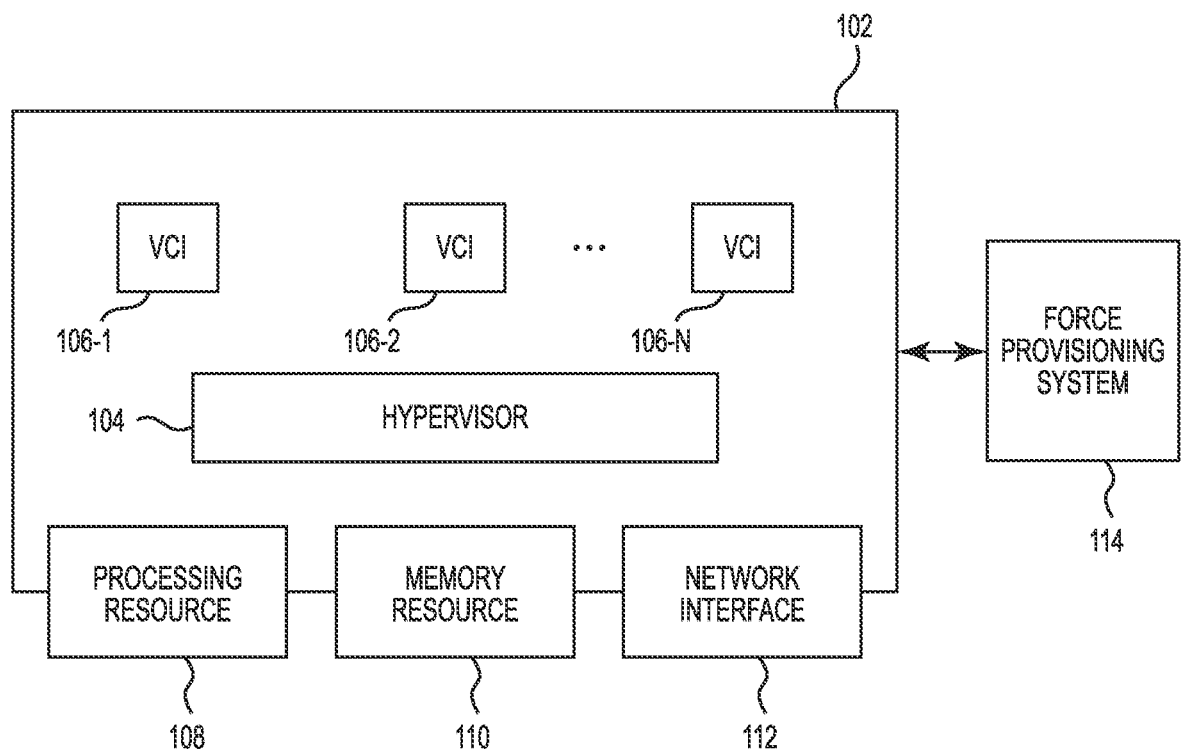
FIG. 1 is a diagram of a host and a system for force provisioning using available resources according to one or more embodiments of the present disclosure.

The term "virtual computing instance" (VCI) refers generally to an isolated user space instance, which can be executed within a virtualized environment. Other technologies aside from hardware virtualization can provide isolated user space instances, also referred to as data compute nodes. Data compute nodes may include non-virtualized physical hosts, VCIs, containers that run on top of a host operating system without a hypervisor or separate operating system, and/or hypervisor kernel network interface modules, among others. Hypervisor kernel network interface modules are non-VCI data compute nodes that include a network stack with a hypervisor kernel network interface and receive/transmit threads.

VCIs, in some embodiments, operate with their own guest operating systems on a host using resources of the host virtualized by virtualization software (e.g., a hypervisor, virtual machine monitor, etc.). The tenant (i.e., the owner of the VCI) can choose which applications to operate on top of the guest operating system. Some containers, on the other hand, are constructs that run on top of a host operating system without the need for a hypervisor or separate guest operating system. The host operating system can use name spaces to isolate the containers from each other and therefore can provide operating-system level segregation of the different groups of applications that operate within different containers. This segregation is akin to the VCI segregation that may be offered in hypervisor-virtualized environments that virtualize system hardware, and thus can be viewed as a form of virtualization that isolates different groups of applications that operate in different containers. Such containers may be more lightweight than VCIs.

While the present disclosure refers generally to VCIs, the examples given could be any type of data compute node, including physical hosts, VCIs, non-VCI containers, and hypervisor kernel network interface modules. Embodiments of the present disclosure can include combinations of different types of data compute nodes.

As used herein with respect to VCIs, a "disk" is a representation of storage policy resources that are used by a VCI. As used herein, "storage policy resource" includes secondary or other storage (e.g., mass storage such as hard drives, solid state drives, removable media, etc., which may include non-volatile memory). The term "disk" implies a single physical memory device being used by a VCI.

When an object, such as a VCI, is created or modified, a storage policy for that VCI may be specified. This specification may be made by a user (e.g., a customer). A storage policy, as referred to herein, is a policy that defines storage requirements for a VCI. Storage requirements can refer to stripe width and/or mirror quantity, among other requirements. A storage policy can determine how the VCI storage objects are provisioned and allocated within a datastore to provide a desired level of performance and/or availability. For instance, depending on preference, customers may prioritize performance or availability in a storage policy. Generally, performance increases with stripe width and availability increases with mirror quantity.

A Redundant Array of Independent (or Inexpensive) Disks (RAID) can employ a flexible stripe width and can allow for flexible quantities of mirrors. RAID is an umbrella term for computer information storage schemes that divide and/or replicate information among multiple memory devices, for instance. The multiple memory devices in a RAID array may appear to a user and the operating system of a computer as a single memory device (e.g., disk). RAID can include striping (e.g., splitting) information so that different portions of the information are stored on different memory devices. The portions of the more than one device that store the split data are collectively referred to as a stripe. In contrast, RAID can also include mirroring, which can include storing duplicate mirrors (e.g., copies) of data on more than one device.

As previously discussed, a storage policy can specify a stripe width and/or a mirror quantity. A stripe width, which may alternatively be referred to as a number of stripes per VCI, is a quantity of memory devices (e.g., disks) across which each replica of a VCI is striped. For example, a stripe width can range from 1 to 12. Stripes may be spread across memory devices of the same or different types, such as magnetic disks, flash devices, or other memory device types, such as those described with respect to the memory resources 510 illustrated in FIG. 5. Mirror quantity refers to a quantity of mirrors (e.g., copies) of data. Mirror quantity can refer to a single mirror or to a plurality of mirrors. For instance, RAID 1 can be configured with one or more mirrors of a set of data on one or more separate disks.

Whether a storage policy specified for a VCI can be satisfied by a software defined datacenter depends on the availability of storage policy resources. Storage policy resources can refer to a quantity of disks and/or an amount of disk space. Thus, a storage policy may not be satisfiable if storage policy resources are insufficient (e.g., unavailable). It is noted that storage policy resources may be simply referred to herein as "resources."

If, however, force provisioning is enabled by a policy setting, the VCI can be force provisioned and deployed. Force provisioning means that the VCI is provisioned with resources other than those specified in the storage policy for the VCI. In previous approaches, force provisioning includes force provisioning VCIs with the simplest possible layout. For example, force provisioning in previous approaches may include a single component RAID 0 configuration with no performance or protection that takes no account of available resources. In previous approaches, if a storage policy specified 2 additional RAID 1 mirrored copies of data but there were insufficient resources to satisfy this specification, no attempt to create even a single RAID 1 mirror would be made; rather, a RAID 0 VCI would be provisioned, which provides no protection.

Embodiments of the present disclosure can determine what resources are actually available in a hyper-converged infrastructure environment when storage policy resources are not sufficient to satisfy a specified storage policy for a VCI. Using the available resources, embodiments herein can determine a "best-match" storage policy for the VCI and force provision the VCI according to the best-match storage policy using the available resources. Stated differently embodiments herein can force provision a VCI with a storage policy that is as close to a desired, specified, storage policy as possible. A best-match storage policy in accordance with the present disclosure can provide increased availability and/or performance compared to previous force provisioning approaches. In the example above where a storage policy specified 2 additional RAID 1 mirrored copies of data, previous approaches may make no attempt to create even a single RAID 1 mirror; rather, a RAID 0 VCI would be force provisioned, which provides no protection. In contrast, a best-match storage policy in accordance the present disclosure may include at least a single RAID 1 mirror to offer some level of protection to the VCI.

In some embodiments, a user may indicate a policy preference associated with force provisioning the VCI. A policy preference can refer to an availability preference. A policy preference can refer to a performance preference. As described further below, the best-match storage policy can be determined based on the indicated preference. Stated differently, if an availability preference is indicated, embodiments of the present disclosure attempt first to achieve protection of the VCI, followed by performance of the VCI. If a performance preference is indicated, embodiments of the present disclosure attempt first to achieve stripe width of the VCI, followed by availability.

After force provisioning, in some cases, storage policy resources sufficient to satisfy the storage policy specified for the VCI may become available. As described further herein, the user can determine whether to keep the force provisioning in such cases or instead to provision the VCI according to the originally specified storage policy.

The figures herein follow a numbering convention in which the first digit or digits correspond to the drawing figure number and the remaining digits identify an element or component in the drawing. Similar elements or components between different figures may be identified by the use of similar digits. For example, 114 may reference element "14" in FIG. 1, and a similar element may be referenced as 414 in FIG. 4. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 is a diagram of a host and a system for force provisioning using available resources according to one or more embodiments of the present disclosure. The system can include a host 102 with processing resources 108 (e.g., a number of processors), memory resources 110, and/or a network interface 112. The host 102 can be included in a software defined data center. A software defined data center can extend virtualization concepts such as abstraction, pooling, and automation to data center resources and services to provide information technology as a service (ITaaS). In a software defined data center, infrastructure, such as networking, processing, and security, can be virtualized and delivered as a service. A software defined data center can include software defined networking and/or software defined storage. In some embodiments, components of a software defined data center can be provisioned, operated, and/or managed through an application programming interface (API).

The host 102 can incorporate a hypervisor 104 that can execute a number of virtual computing instances 106-1, 106-2, . . . , 106-N (referred to generally herein as "VCIs 106"). The VCIs can be provisioned with processing resources 108 and/or memory resources 110 and can communicate via the network interface 112. The processing resources 108 and the memory resources 110 provisioned to the VCIs can be local and/or remote to the host 102. For example, in a software defined data center, the VCIs 106 can be provisioned with resources that are generally available to the software defined data center and not tied to any particular hardware device. By way of example, the memory resources 110 can include volatile and/or non-volatile memory available to the VCIs 106. The VCIs 106 can be moved to different hosts (not specifically illustrated), such that a different hypervisor manages the VCIs 106. The host 102 can be in communication with a force provisioning system 114. An example of the force provisioning system is illustrated and described in more detail below. In some embodiments, the force provisioning system 114 can be a server, such as a web server.

Figure 2:
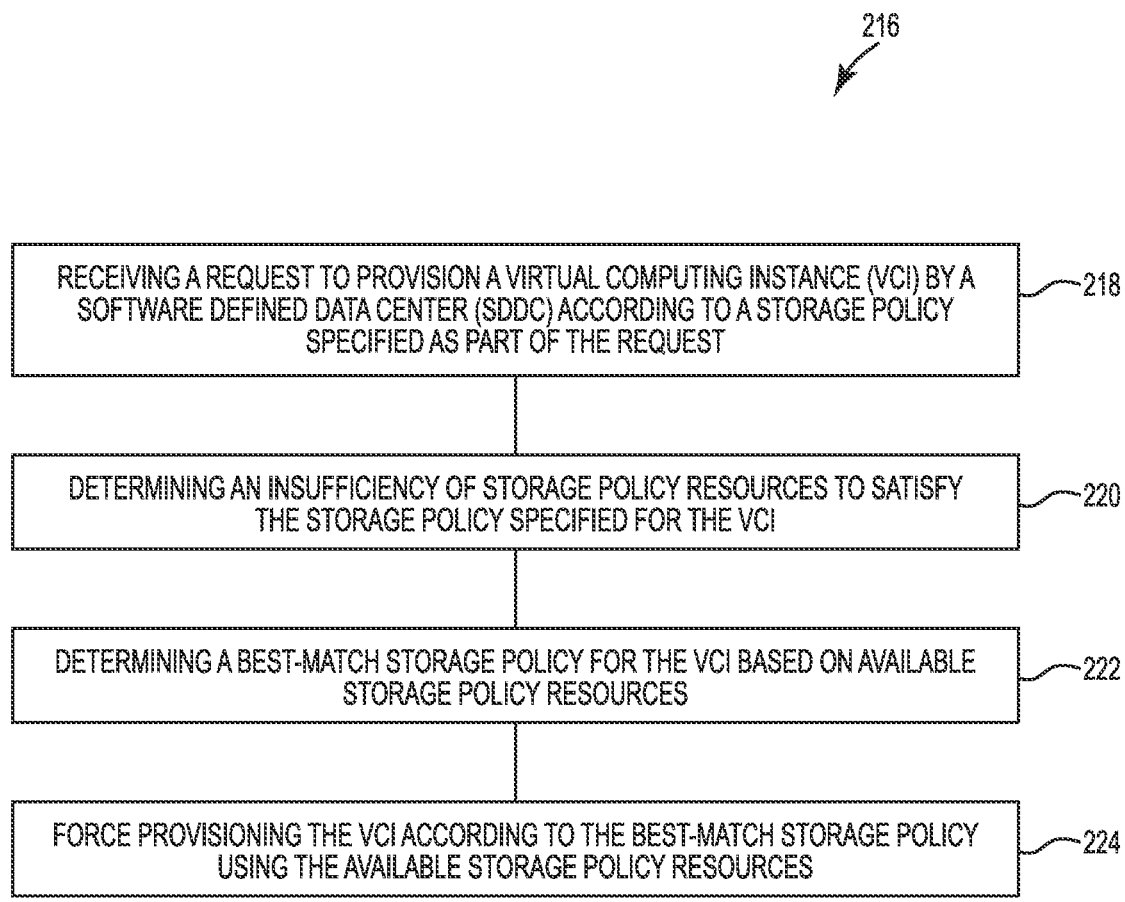
FIG. 2 illustrates a method for force provisioning using available resources according to one or more embodiments of the present disclosure.

FIG. 2 illustrates a method 216 for force provisioning using available resources according to one or more embodiments of the present disclosure. The method 216 can be performed by a server (e.g., the force provisioning system 114, previously described in connection with FIG. 1), though embodiments of the present disclosure are not so limited.

At 218, the method 216 can include receiving a request to provision a VCI by an SDDC according to a storage policy specified as part of the request. A storage policy can specify a stripe width. A storage policy can specify a mirror quantity. The storage policy can define stripe width and/or mirror quantity requirements for a VCI.

At 220, the method 216 can include determining an insufficiency of storage policy resources to satisfy the storage policy specified for the VCI. Storage policy resources can refer to a quantity of disks and/or an amount of disk space. Thus, a storage policy may not be satisfiable if storage policy resources are insufficient (e.g., unavailable). In an example, storage policy resources of 2 RAID 1 mirrored copies may be insufficient to satisfy a storage policy specifying 3 RAID 1 mirrored copies.

At 222, the method 216 can include determining a best-match storage policy for the VCI based on available storage policy resources. Determining a best-match storage policy is described below in connection with FIG. 3 and can include, for instance, determining a best-match mirror quantity and/or a best-match stripe width for the VCI. At 224, the method 216 can include force provisioning the VCI according to the best-match storage policy using the available storage policy resources.

Figure 3:
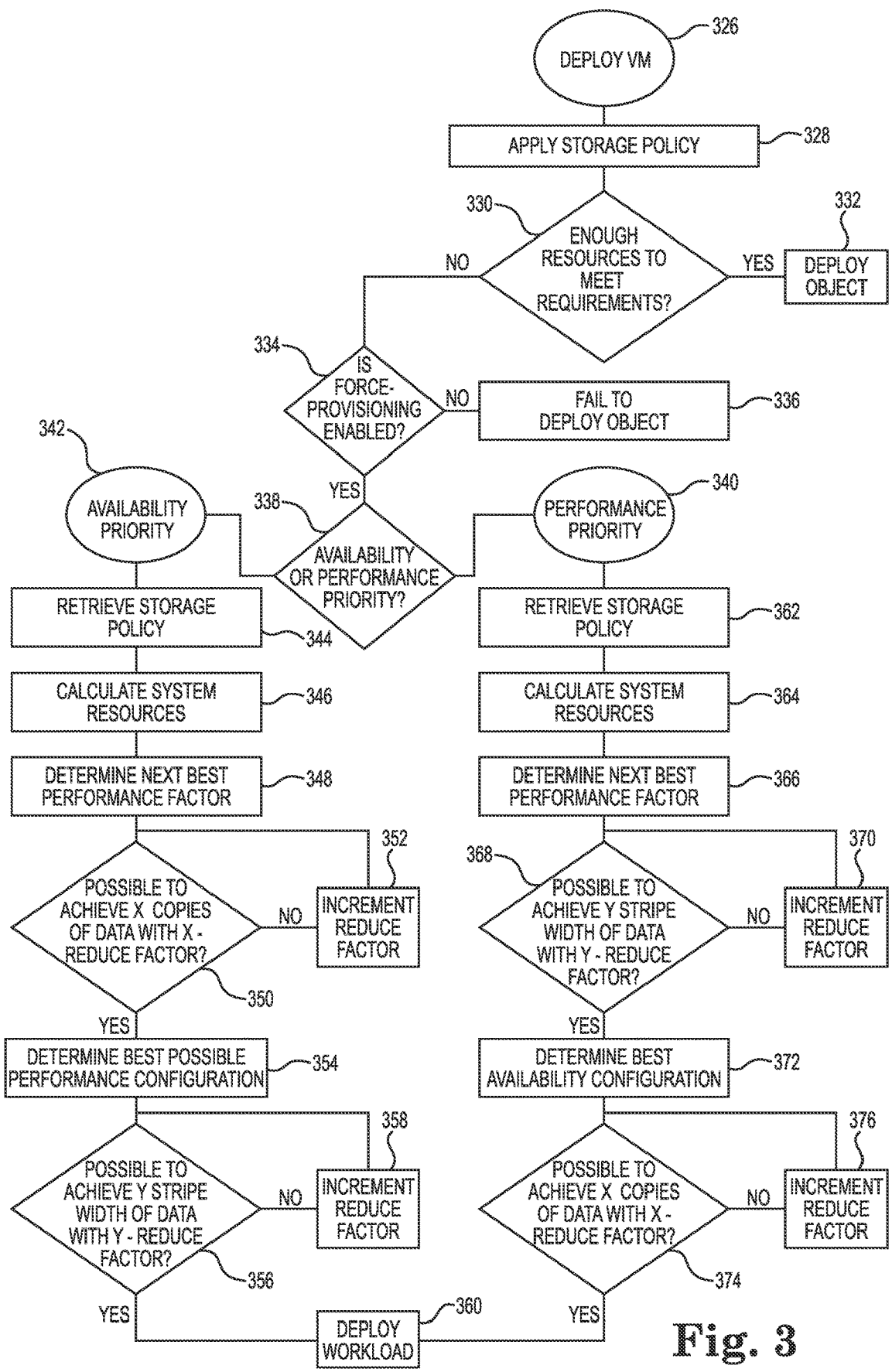
FIG. 3 illustrates a flow chart associated with a method of force provisioning using available resources according to one or more embodiments of the present disclosure.

FIG. 3 illustrates a flow chart associated with a method of force provisioning using available resources according to one or more embodiments of the present disclosure. At 326, the method can include receiving a request to provision a VCI ("Deploy VM"). The request can be received by an SDDC. The request can include a specification of a storage policy applied at 328. At 330, the method can include determining whether there are enough resources to meet the requirements of the storage policy. If there are enough resources, the VCI is deployed according to the specified policy at 332 ("Deploy Object"). If not, the method can include, at 334, determining whether force provisioning is enabled. If not, deployment of the VCI fails at 336. If force provisioning is enabled, the method can include, at 338, determining whether an indication of an availability preference or a performance preference was made.

If an availability preference is indicated, at 342 the method can include retrieving the storage policy at 344, calculating system resources at 346, and determining a best-match availability factor at 348. If, for example, a specified availability factor was 2 RAID 1 mirrors, a best-match availability factor may be 1 RAID 1 mirror. Determining a best-match availability factor can include, at 350, determining whether resources are available satisfy a request for a particular mirror quantity. Stated differently, if a request is for X mirrors of data, a determination can be made whether resources are available to satisfy a quantity of X minus a "mirror reduce factor." Initially, the reduce factor can be set at 1. If sufficient resources are available for the reduced quantity of mirrors X−1, the reduced quantity of mirrors is determined as the best-match mirror quantity. If insufficient resources are available, the mirror reduce factor can be incremented at 352, and the determination at 350 can be repeated with the incremented reduce factor (e.g., X−2). If insufficient resources persist, the incrementation of the mirror reduce factor can be repeated until the reduce factor equals X. At such point, the method can include deploying a RAID 0 configuration as the best-match policy for the VCI.

At 354, the method can include determining a best-possible performance configuration. Determining the best possible performance configuration can include, at 356, determining whether resources are available to satisfy a request for a particular stripe width. Stated differently, if a request is for a stripe width of Y, a determination can be made whether resources are available to satisfy a width of Y minus a "stripe reduce factor." Initially, the stripe reduce factor can be set at 1. If sufficient resources are available for the reduced stripe width, the reduced stripe width is determined as the best-match stripe width and deployed at 360. If insufficient resources are available, the stripe reduce factor can be incremented at 358, and the determination at 356 can be repeated with the incremented stripe reduce factor. If insufficient resources persist, the incrementation of the stripe reduce factor can be repeated until the stripe reduce factor equals Y. At such point, the method can include deploying a RAID 0 configuration as the best-match policy for the VCI at 360.

At 338, if instead of an availability preference, a performance preference is indicated, at 340 the method can include retrieving the storage policy at 362, calculating system resources at 364, and determining a best match performance factor at 366. Determining a best match performance factor can include, at 368, determining whether resources are available to satisfy a request for a particular stripe width. Stated differently, if a request is for a stripe width of Y, a determination can be made whether resources are available to satisfy a width of Y minus a "stripe reduce factor." Initially, the stripe reduce factor can be set at 1. If sufficient resources are available for the reduced stripe width Y−1, the reduced stripe width is determined as the best-match stripe width. If insufficient resources are available, the stripe reduce factor can be incremented at 370, and the determination at 368 can be repeated with the incremented stripe reduce factor (e.g., Y−2). If insufficient resources persist, the incrementation of the stripe reduce factor can be repeated until the stripe reduce factor equals Y. At such point, the method can include deploying a RAID 0 configuration as the best-match policy for the VCI.

At 372, the method can include determining a best-match availability configuration. Determining a best-match availability configuration can include, at 374, determining whether resources are available satisfy a request for a particular mirror quantity. Stated differently, if a request is for X mirrors of data, a determination can be made whether resources are available to satisfy a quantity of X minus a "mirror reduce factor." Initially, the reduce factor can be set at 1. If sufficient resources are available for the reduced quantity of mirrors, the reduced quantity of mirrors is determined as the best-match mirror quantity and deployed at 360. If insufficient resources are available, the mirror reduce factor can be incremented at 376, and the determination at 374 can be repeated with the incremented reduce factor. If insufficient resources persist, the incrementation of the mirror reduce factor can be repeated until the reduce factor equals X. At such point, the method can include deploying a RAID 0 configuration as the best-match policy for the VCI at 360.

More generally, if an availability preference is indicated at 342, the method can include first determining a best-match mirror quantity for the VCI based on available resources and then achieving performance through a best-match stripe width for the VCI based on available resources. Alternatively, if a performance preference is indicated at 340, the method can include first determining a best-match stripe width for the VCI based on available resources and then achieving availability through a best-match mirror quantity. In some embodiments, a best-match mirror quantity refers to highest available quantity of RAID 1 mirrors.

Figure 4:
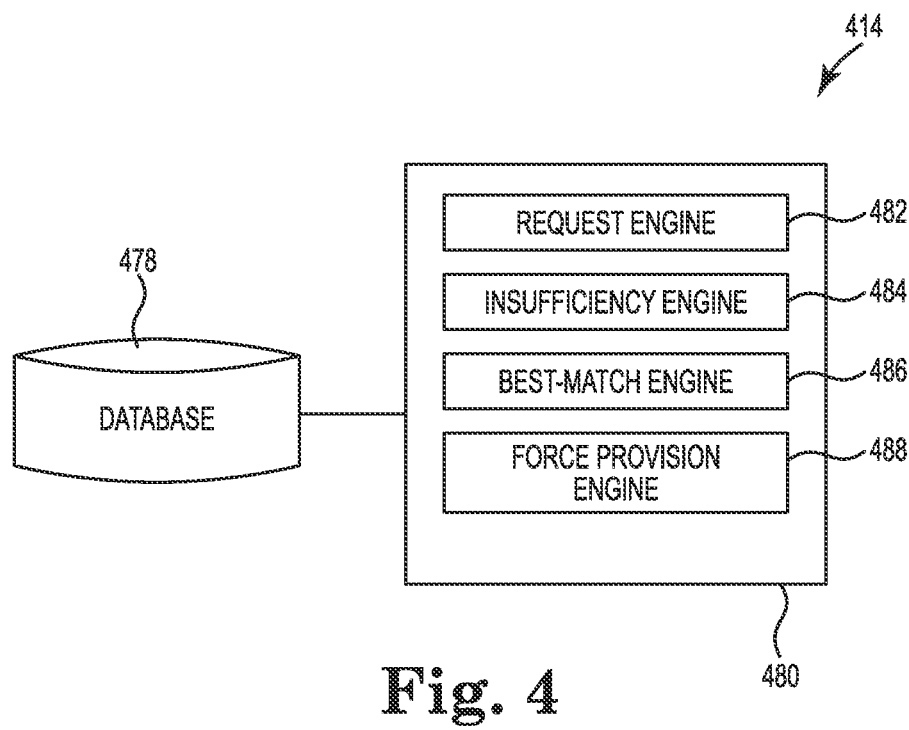
FIG. 4 is a diagram of a system for force provisioning using available resources according to one or more embodiments of the present disclosure.

FIG. 4 is a diagram of a system 414 for force provisioning using available resources according to one or more embodiments of the present disclosure. The system 414 can include a database 478, a subsystem 480, and/or a number of engines, for example request engine 482, insufficiency engine 3584, best-match engine 486, force provision engine 488, and can be in communication with the database 478 via a communication link. The system 414 can include additional or fewer engines than illustrated to perform the various functions described herein. The system can represent program instructions and/or hardware of a machine (e.g., machine 590 as referenced in FIG. 5, etc.). As used herein, an "engine" can include program instructions and/or hardware, but at least includes hardware. Hardware is a physical component of a machine that enables it to perform a function. Examples of hardware can include a processing resource, a memory resource, a logic gate, an application specific integrated circuit, a field programmable gate array, etc.

The number of engines can include a combination of hardware and program instructions that is configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic) can be considered as both program instructions and hardware.

In some embodiments, the request engine 482 can include a combination of hardware and program instructions that is configured to receive a request to provision a VCI by an SDDC according to a storage policy specified as part of the request. In some embodiments, the insufficiency engine 484 can include a combination of hardware and program instructions that is configured to determine an insufficiency of storage policy resources to satisfy the storage policy specified for the VCI. In some embodiments, the best-match engine 486 can include a combination of hardware and program instructions that is configured to determine a best-match storage policy for the VCI based on available storage policy resources. In some embodiments, the force provision engine 488 can include a combination of hardware and program instructions that is configured to force provision the VCI according to the best-match storage policy using the available storage policy resources.

Figure 5:
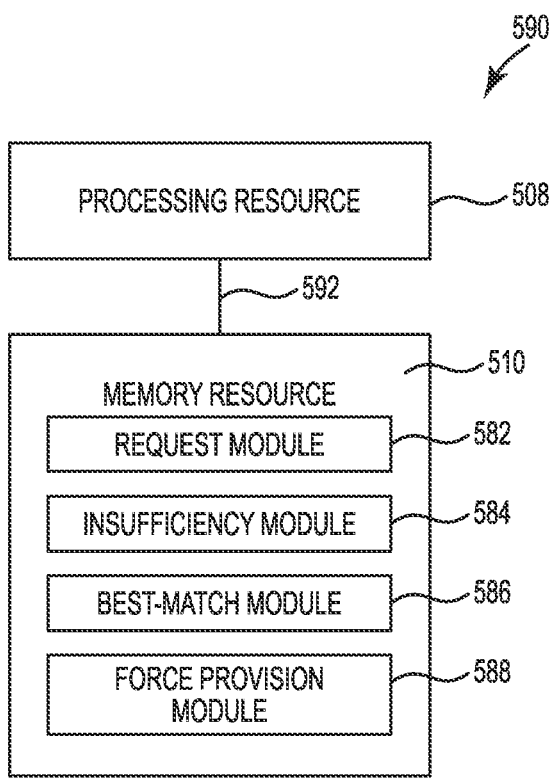
FIG. 5 is a diagram of a machine for force provisioning using available resources according to one or more embodiments of the present disclosure.

FIG. 5 is a diagram of a machine 590 for force provisioning using available resources according to one or more embodiments of the present disclosure. The machine 590 can utilize software, hardware, firmware, and/or logic to perform a number of functions. The machine 590 can be a combination of hardware and program instructions configured to perform a number of functions (e.g., actions). The hardware, for example, can include a number of processing resources 508 and a number of memory resources 510, such as a machine-readable medium (MRM) or other memory resources 510. The memory resources 510 can be internal and/or external to the machine 590 (e.g., the machine 590 can include internal memory resources and have access to external memory resources). In some embodiments, the machine 590 can be a VCI. The program instructions (e.g., machine-readable instructions (MM)) can include instructions stored on the MRM to implement a particular function (e.g., an action such as creating a live snapshot at an end of a snapshot chain, as described herein). The set of MRI can be executable by one or more of the processing resources 508. The memory resources 510 can be coupled to the machine 590 in a wired and/or wireless manner. For example, the memory resources 510 can be an internal memory, a portable memory, a portable disk, and/or a memory associated with another resource, e.g., enabling MRI to be transferred and/or executed across a network such as the Internet. As used herein, a "module" can include program instructions and/or hardware, but at least includes program instructions.

Memory resources 510 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change memory (PCM), 3D cross-point, ferroelectric transistor random access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, magnetic memory, optical memory, and/or a solid state drive (SSD), etc., as well as other types of machine-readable media.

The processing resources 508 can be coupled to the memory resources 510 via a communication path 592. The communication path 592 can be local or remote to the machine 590. Examples of a local communication path 592 can include an electronic bus internal to a machine, where the memory resources 510 are in communication with the processing resources 508 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 592 can be such that the memory resources 510 are remote from the processing resources 508, such as in a network connection between the memory resources 510 and the processing resources 508. That is, the communication path 592 can be a network connection. Examples of such a network connection can include a local area network (LAN), wide area network (WAN), personal area network (PAN), and the Internet, among others.

As shown in FIG. 5, the MRI stored in the memory resources 510 can be segmented into a number of modules 582, 584, 586, 588 that when executed by the processing resources 508 can perform a number of functions. As used herein a module includes a set of instructions included to perform a particular task or action. The number of modules 582, 584, 586, 588 can be sub-modules of other modules. For example, the force provision module 588 can be a sub-module of the best-match module 586 and/or can be contained within a single module. Furthermore, the number of modules 582, 344684, 586, 588 can comprise individual modules separate and distinct from one another. Examples are not limited to the specific modules 582, 584, 586, 588 illustrated in FIG. 5.

Each of the number of modules 582, 584, 586, 588 can include program instructions and/or a combination of hardware and program instructions that, when executed by a processing resource 508, can function as a corresponding engine as described with respect to FIG. 3. For example, the request module 582 can include program instructions and/or a combination of hardware and program instructions that, when executed by a processing resource 508, can function as the request engine 482, though embodiments of the present disclosure are not so limited.

The machine 590 can include a request module 582, which can include instructions to receive a request to provision a VCI by an SDDC according to a storage policy specified as part of the request. The machine 590 can include an insufficiency engine, which can include instructions to determine an insufficiency of storage policy resources to satisfy the storage policy specified for the VCI. The machine 590 can include a best-match engine 586, which can include instructions to determine a best-match storage policy for the VCI based on available storage policy resources. The machine 590 can include a force provision engine 588, which can include instructions to force provision the VCI according to the best-match storage policy using the available storage policy resources.

Some embodiments can include instructions to provide a notification of the force provisioning of the VCI. In response to the notification, a request can be received regarding what is to occur when resources sufficient to satisfy the storage policy specified for the VCI become available. Some embodiments include receiving a request, in response to the notification, to maintain the force provisioning of the VCI after storage policy resources sufficient to satisfy the storage policy specified for the VCI become available. The machine 590 can include instructions to maintain the force provisioning responsive to such a request.

Other embodiments include receiving a request, in response to the notification, to provision the VCI according to the storage policy specified for the VCI after policy resources sufficient to satisfy the storage policy specified for the VCI become available. The machine 590 can include instructions to provision the VCI according to the storage policy specified for the VCI responsive to such a request.

The present disclosure is not limited to particular devices or methods, which may vary. The terminology used herein is for the purpose of describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
    receiving a request to provision a virtual computing instance (VCI) by a software defined data center (SDDC) according to a storage policy specified as part of the request;
    determining an insufficiency of storage policy resources to satisfy the storage policy specified for the VCI;
    determining a best-match storage policy for the VCI based on available storage policy resources, wherein the best-match storage policy provides less availability or performance than the storage policy specified for the VCI;
    force provisioning and deploying the VCI according to the best-match storage policy using the available storage policy resources;
    determining an insufficiency of storage policy resources to satisfy the requested VCI stripe width;
    determining a best-match stripe width for the VCI based on available storage policy resources; and
    force provisioning the VCI with the best-match stripe width using the available storage policy resources.

2. The method of claim 1, wherein the method includes:
    receiving an indication of a policy preference associated with force provisioning the VCI; and
    determining the best-match storage policy for the VCI based on the policy preference.

3. The method of claim 1, wherein the method includes:
    receiving a selection of one of: an availability preference and a performance preference associated with force provisioning the VCI; and
    determining the best-match storage policy for the VCI based on the selected preference.

4. The method of claim 1, wherein the storage policy includes a requested VCI mirror quantity, and wherein the method further includes:
    determining an insufficiency of storage policy resources to satisfy the requested VCI mirror quantity;
    determining a best-match mirror quantity for the VCI based on available storage policy resources; and
    force provisioning the VCI with the best-match mirror quantity using the available storage policy resources.

5. The method of claim 1, wherein the method includes:
    providing a notification of the force provisioning of the VCI;
    receiving a request, in response to the notification, to maintain the force provisioning of the VCI after storage policy resources sufficient to satisfy the storage policy specified for the VCI become available; and
    maintaining the force provisioning responsive to the request.

6. The method of claim 1, wherein the method includes:
    providing a notification of the force provisioning of the VCI;
    receiving a request, in response to the notification, to provision the VCI according to the storage policy specified for the VCI after policy resources sufficient to satisfy the storage policy specified for the VCI become available; and provisioning the VCI according to the storage policy specified for the VCI responsive to the request.

7. A non-transitory machine-readable medium having instructions stored thereon which, when executed by a processor, cause the processor to:
receive a request to provision a virtual computing instance (VCI) by a software defined data center (SDDC) according to a storage policy specified as part of the request;
determine an insufficiency of storage policy resources to satisfy the storage policy specified for the VCI;
determine a best-match storage policy for the VCI based on available storage policy resources, wherein the best-match storage policy provides less availability or performance than the storage policy specified for the VCI;
force provision and deploy the VCI according to the best-match storage policy using the available storage policy resources;
provide a notification of the force provisioning of the VCI;
receive a request, in response to the notification, to maintain the force provisioning of the VCI after storage policy resources sufficient to satisfy the storage policy specified for the VCI become available; and
maintain the force provisioning responsive to the request.

8. The medium of claim 7, including instructions to:
receive an indication of a policy preference associated with force provisioning the VCI; and
determine the best-match storage policy for the VCI based on the policy preference.

9. The medium of claim 7, including instructions to:
receive a selection of one of: an availability preference and a performance preference associated with force provisioning the VCI; and
determine the best-match storage policy for the VCI based on the selected preference.

10. The medium of claim 7, wherein the storage policy includes a requested VCI mirror quantity, and wherein the instructions include instructions to:
determine an insufficiency of storage policy resources to satisfy the requested VCI mirror quantity;
determine a best-match mirror quantity for the VCI based on available storage policy resources; and
force provision the VCI with the best-match mirror quantity using the available storage policy resources.

11. The medium of claim 7, wherein the storage policy includes a requested VCI stripe width, and wherein the instructions include instructions to:
determine an insufficiency of storage policy resources to satisfy the requested VCI stripe width;
determine a best-match stripe width for the VCI based on available storage policy resources; and
force provision the VCI with the best-match stripe width using the available storage policy resources.

12. The medium of claim 7, including instructions to:
provide a notification of the force provisioning of the VCI;
receive a request, in response to the notification, to provision the VCI according to the storage policy specified for the VCI after policy resources sufficient to satisfy the storage policy specified for the VCI become available; and provision the VCI according to the storage policy specified for the VCI responsive to the request.

13. A system, comprising:
a request engine configured to receive a request to provision a virtual computing instance (VCI) by a software defined data center (SDDC) according to a storage policy specified as part of the request;
an insufficiency engine configured to determine an insufficiency of storage policy resources to satisfy the storage policy specified for the VCI;
a best-match engine configured to determine a best-match storage policy for the VCI based on available storage policy resources, wherein the best-match storage policy provides less availability or performance than the storage policy specified for the VCI;
a force provision engine configured to force provision and deploy the VCI according to the best-match storage policy using the available storage policy resources;
provide a notification of the force provisioning of the VCI;
receive a request, in response to the notification, to maintain the force provisioning of the VCI after storage policy resources sufficient to satisfy the storage policy specified for the VCI become available; and
maintain the force provisioning responsive to the request.

14. The system of claim 13, wherein:
the request engine is configured to receive an indication of a policy preference associated with force provisioning the VCI; and
the best-match engine is configured to determine the best-match storage policy for the VCI based on the policy preference.

15. The system of claim 13, wherein:
the request engine is configured to receive a selection of one of: an availability preference and a performance preference associated with force provisioning the VCI; and
the best match engine is configured to determine the best-match storage policy for the VCI based on the selected preference.

16. The system of claim 13, wherein the storage policy includes a requested VCI mirror quantity, and wherein:
the insufficiency engine is configured to determine an insufficiency of storage policy resources to satisfy the requested VCI mirror quantity;
the best match engine is configured to determine a best-match mirror quantity for the VCI based on available storage policy resources; and
the force provision engine is configured to force provision the VCI with the best-match mirror quantity using the available storage policy resources.

17. The system of claim 13, wherein the storage policy includes a requested VCI stripe width, and wherein:
the insufficiency engine is configured to determine an insufficiency of storage policy resources to satisfy the requested VCI stripe width;
the best match engine is configured to determine a best-match stripe width for the VCI based on available storage policy resources; and
the force provision engine is configured to force provision the VCI with the best-match stripe width using the available storage policy resources.

* * * * *